United States Patent
Vaughn et al.

(10) Patent No.: US 11,899,457 B1
(45) Date of Patent: Feb. 13, 2024

(54) AUGMENTING AUTONOMOUS DRIVING WITH REMOTE VIEWER RECOMMENDATION

(71) Applicant: Mobileye Vision Technologies Ltd., Jerusalem (IL)

(72) Inventors: Robert Vaughn, Portland, OR (US); Casey Baron, Chandler, AZ (US)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 0 days.

(21) Appl. No.: 18/077,752

(22) Filed: Dec. 8, 2022

Related U.S. Application Data

(63) Continuation of application No. 16/286,245, filed on Feb. 26, 2019, now Pat. No. 11,561,540.

(51) Int. Cl.
| | |
|---|---|
| *G05D 1/00* | (2006.01) |
| *G06N 3/08* | (2023.01) |
| *G05D 1/02* | (2020.01) |
| *G06N 3/04* | (2023.01) |
| *B60W 40/02* | (2006.01) |

(52) U.S. Cl.
CPC ........... *G05D 1/0088* (2013.01); *B60W 40/02* (2013.01); *G05D 1/0033* (2013.01); *G05D 1/0038* (2013.01); *G05D 1/0214* (2013.01); *G05D 1/0221* (2013.01); *G06N 3/04* (2013.01); *G06N 3/08* (2013.01); *G05D 2201/0213* (2013.01)

(58) Field of Classification Search
CPC .. G05D 1/0088; G05D 1/0033; G05D 1/0038; G05D 1/0214; G05D 1/0221; G05D 2201/0213; B60W 40/02; G06N 3/04; G06N 3/08
See application file for complete search history.

(56) References Cited

U.S. PATENT DOCUMENTS

| | | | |
|---|---|---|---|
| 6,208,981 B1 * | 3/2001 | Graf ..................... | B60G 17/018 706/2 |
| 8,849,494 B1 * | 9/2014 | Herbach .............. | G05D 1/0044 701/24 |
| 11,561,540 B2 * | 1/2023 | Vaughn .................... | G06N 3/04 |

(Continued)

FOREIGN PATENT DOCUMENTS

WO WO-2019199967 A1 * 10/2019

*Primary Examiner* — Donald J Wallace
(74) *Attorney, Agent, or Firm* — FINNEGAN, HENDERSON, FARABOW, GARRETT & DUNNER LLP

(57) ABSTRACT

Autonomous vehicles are an exciting prospect to the future of driving. However, concerns about the decision-making made by the AI controlling a vehicle has been of concern, particularly in light of high-profile accidents. We can alleviate some concern, introduce better decisions, and also train an AI to make better decisions by introducing a remote viewer's, e.g., a human's, reaction to a possibly complex environment surrounding a vehicle that includes a potential threat to the vehicle. One or more remote viewer may provide a recommended response to the threat that may be incorporated in whole or in part in how the vehicle reacts. Various ways to engage and utilize remote viewers are proposed to improve the likelihood of receiving useful recommendations, including modifying how the environment is presented to a remote viewer to best suit the remote viewer, e.g., perhaps present the threat in a game.

20 Claims, 9 Drawing Sheets

(56) References Cited

U.S. PATENT DOCUMENTS

| | | | |
|---|---|---|---|
| 2017/0123429 A1* | 5/2017 | Levinson | G01S 17/87 |
| 2017/0192423 A1* | 7/2017 | Rust | G05D 1/0238 |
| 2018/0004214 A1* | 1/2018 | Wisniowski | G08G 1/09675 |
| 2019/0114549 A1* | 4/2019 | Olsher | G06F 40/30 |
| 2019/0196471 A1* | 6/2019 | Vaughn | G05D 1/0214 |
| 2019/0294922 A1* | 9/2019 | Clark | G06N 3/02 |
| 2020/0001888 A1* | 1/2020 | Pretsch | G05B 17/02 |
| 2020/0033880 A1* | 1/2020 | Kehl | G01S 17/89 |
| 2020/0035030 A1* | 1/2020 | Schradin | G06T 17/05 |
| 2020/0192393 A1* | 6/2020 | Aragon | G05D 1/0221 |
| 2020/0198629 A1* | 6/2020 | Johnson | B60W 60/0015 |
| 2020/0302094 A1* | 9/2020 | Greenwood | G06N 3/126 |

* cited by examiner

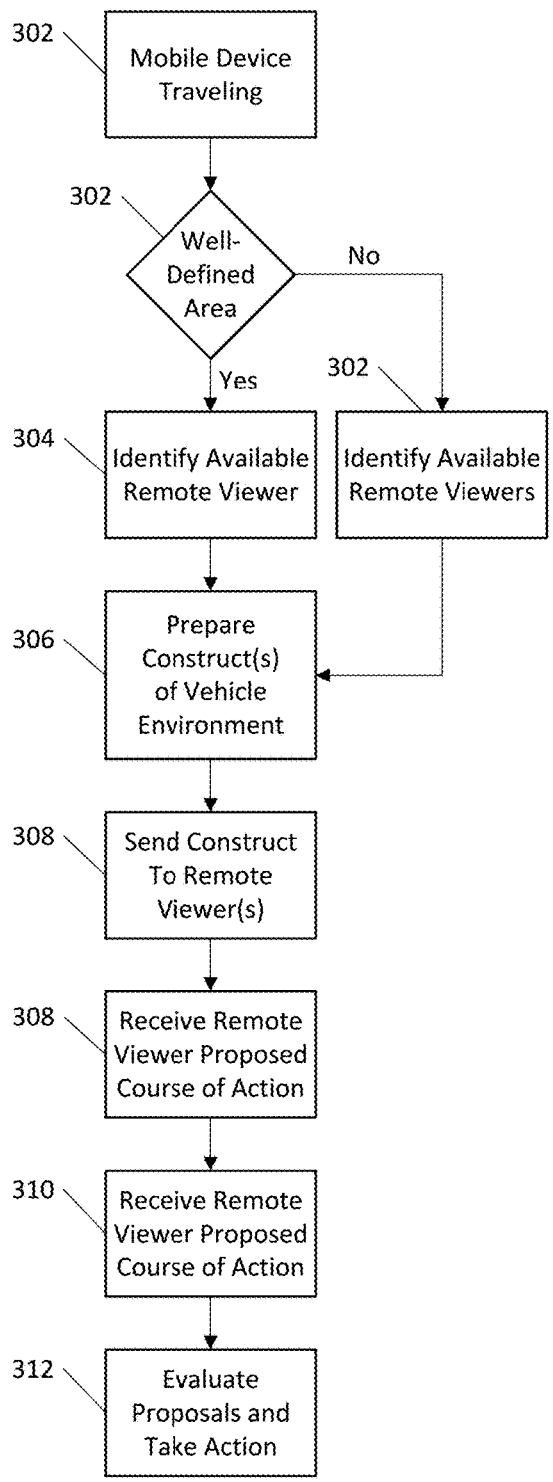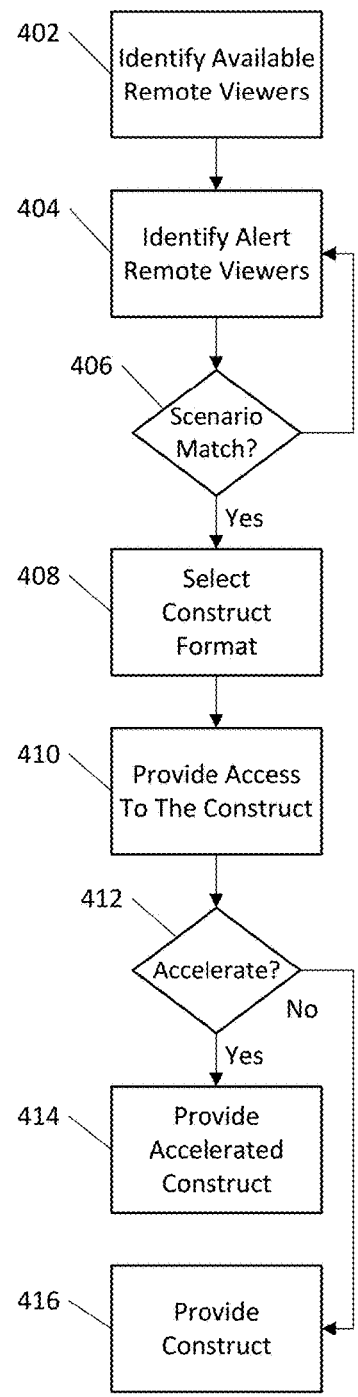
FIG. 3
FIG. 4

AUGMENTING AUTONOMOUS DRIVING WITH REMOTE VIEWER RECOMMENDATION

RELATED APPLICATIONS

The present application is a continuation of U.S. application Ser. No. 16/286,245, filed Feb. 26, 2019, the contents of which is hereby incorporated by reference herein in its entirety and for all purposes.

TECHNICAL FIELD

The present disclosure relates to autonomous and/or semi-autonomous device movement, and more particularly, to assisting device movement by augmenting and/or replacing local decision-making with remote driver input.

BACKGROUND AND DESCRIPTION OF RELATED ART

Over the past several years that has been a lot of research into automating vehicle operation, such as providing autonomous vehicles designed to automatically drive passengers around with little to no passenger assistance. It will be appreciated this is a developing technology area and many different organizations are seeking to standardize the operation of such vehicles. For example, the Society of Automotive Engineers (SAE), a globally reaching organization has defined levels of driving automation in SAE International standard J3016. See, e.g., Internet Uniform Resource Locator (URL) www.sae.org/misc/pdfs/automated_driving.pdf. The SAE system is a good overview of some types of autonomous vehicles, where of the 5 automation levels the last three (levels 3-5) correspond to what one might think of as a vehicle doing the driving for the passengers. In response to developing technologies, various legislative entities seek to establish regulations concerning autonomous vehicle operation. See, for example, the National Conference of State Legislatures (NCSL) Internet web site that seeks to track legislative responses to autonomous vehicles. The NCSL states "Autonomous vehicles seem poised to transform and disrupt many of the basic, longstanding fundamentals of the American transportation system. As the technology for autonomous vehicles continues to develop, state governments are beginning to debate and address the potential benefits and impacts of these vehicles." See Internet URL www.ncsl.org/research/transportation/autonomous-vehicles-legislative-database.aspx.

Self-driving vehicles today rely on radar, LIDAR (Light Detection and Ranging), cameras and other sensors installed in a car to detect its environment and possible dangerous situations. The sensors can often detect issues/danger more precisely and faster than human eyes. Digitized sensor details may be processed by on board computer(s) to establish a model of the car's surroundings. A processing environment, such as an Artificial Intelligence tasked with interpreting sensor details may be able to detect trouble in the environment and adjust the car's travel to select the best route forward, and operate the car accordingly.

It will be appreciated while being autonomous, autonomous vehicles may be expected to operate in conjunction with smart environments, such as a "smart city" traffic control to assist autonomous vehicles. An exemplary test environment is the University of Michigan's 32-acre Mobility Transformation Center (MCity). See for example Internet URL mcity.umich.edu/our-work/mcity-test-facility. Technologies such as these may provide a safe environment in which autonomous vehicles may operate. But, while much of the technical developments and legislative effort concerns creation of safe cars and regulatory environments to promote continued development, an interesting issue remains: how confident are we in the decisions made by autonomous vehicles, and how can we assist the decision-making?

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 3 illustrates an exemplary flowchart 300.

FIG. 4 illustrates an exemplary flowchart 400 illustrating selecting an available remote viewer.

DETAILED DESCRIPTION

Figure 1:
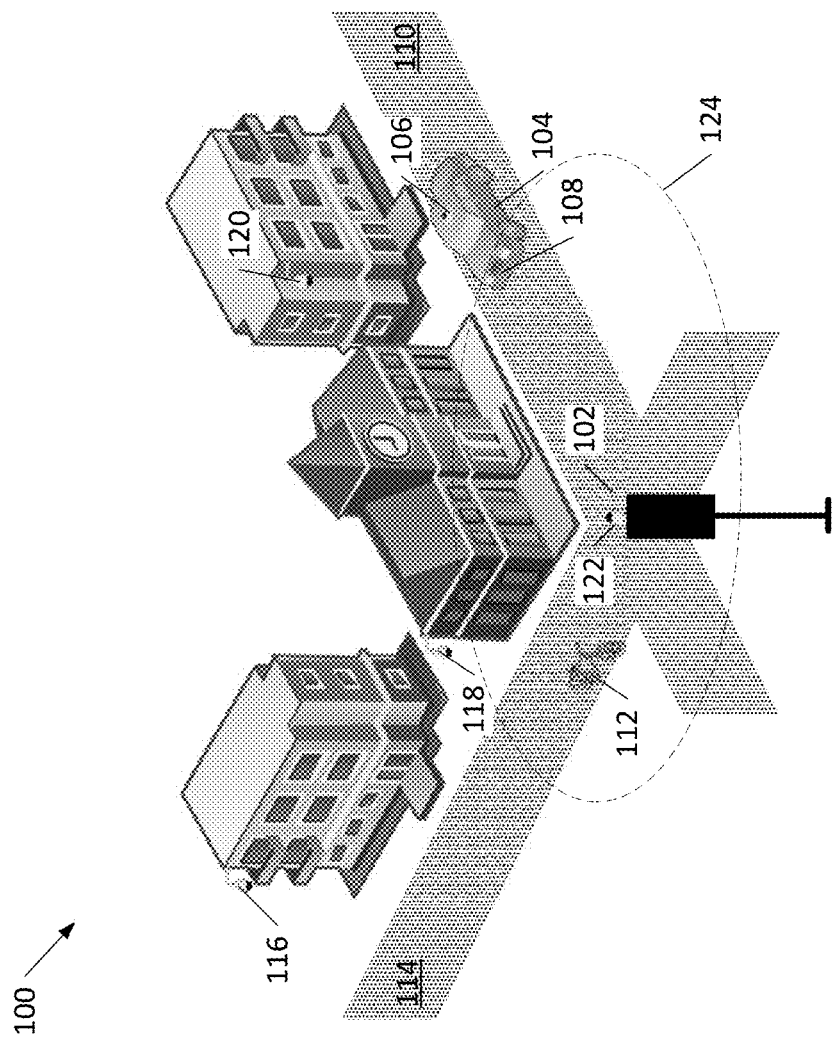
FIG. 1 illustrates an exemplary environment 100 showing an intersection 102 with various potential threats to operation of a mobile device, such as a vehicle 104.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations do not have to be performed in the order of presentation. Operations described may be performed in a different order than the described embodiment. Various additional operations may be performed and/or described operations may be omitted in additional embodiments. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are considered synonymous.

As used herein, the term semi-autonomous driving is synonymous with computer-assisted driving. The term does not mean exactly 50% of the driving functions are automated. The percentage of automated driving functions may vary between 0% and 100%. In addition, it will be appreciated the hardware, circuitry and/or software implementing semi-autonomous driving may temporarily provide no automation, or 100% automation, such as in response to an emergency situation even when a person is driving. The term "CA" refers to computer-assisted. The term "AD" refers to an Autonomous Driving vehicle. The term "SAD" refers to a semi-autonomous vehicle. And the term ADAS refers to advanced driver-assistance systems that generally work in conjunction with AD/SAD systems to provide automated security and safety features such as collision detection and avoidance.

A vehicle may detect its environment and an Artificial Intelligence (AI) may adjust operation of the car based on what is detected. In various discussion of AI herein, it is assumed one is familiar with AI, neural networks, such as feedforward neural network (FNN), convolutional neural network (CNN), deep learning, and establishing an AI, a model and its operation. See the discussion below with respect to FIG. 5. And, see also exemplary documents: *Deep Learning* by Goodfellow et al., MIT Press (2016) (at Internet Uniform Resource Locator (URL) www*deeplearning-book*org); www*matthewzeiler*com/wp-content/uploads/2017/07/arxive 2013*pdf; *Dynamic Occupancy Grid Prediction for Urban Autonomous Driving: A Deep Learning Approach with Fully Automatic Labeling*, Hoerman et al. 2017, at Internet URL arxiv.org/abs/1705.08781v2; and Nuss et al. 2016, *A Random Finite Set Approach for Dynamic Occupancy Grid Maps with Real-Time Application* at Internet URL arxiv*org/abs/1605*02406 (to prevent inadvertent hyperlinks, periods in the preceding URLs were replaced with asterisks).

In one embodiment the AI is a software implementation operating within a mobile device (e.g., car, bus, motorcycle, bicycle, plane, drone, robot, balloon, or any device or vehicle that may direct its movement in some way with or without human passengers on board). The term "vehicle" will be used interchangeably herein with "mobile device" however "mobile device" is not intended to be limited to cars or automobiles. In one embodiment the AI is disposed in a separate machine communicatively coupled with the mobile device. It will be appreciated a mobile device or other machine may be mobile by way of one or more locomotion techniques including ambulatory (walking-type) motion, rolling, treads, tracks, wires, magnetic movement, levitation, flying, etc. An AI may intermittently, or continuously, monitor a mobile device's environment and learn patterns of activity, and in particular, learn typical responses and/or actions that may occur responsive to events occurring in the environment (see also FIG. 5). It will be appreciated an AI may be used to provide predictive abilities, such as predicting movement of threats to a vehicle, as well as to generate constructs that represent a real or speculated threat to the mobile device that may be presented to external entities (see, e.g., FIG. 2 remote viewers 206-214) for recommended responses, e.g., for a vehicle, a remote viewer may recommend a driving strategy to address a threat. The AI may update its training based on these responses.

One limitation of an AI, however, is that the mobile device is limited to what it can sense. It will be appreciated a car's line of sight may be obscured, such as by other vehicles, buildings, permanent or temporary structures, weather, obstructions on the car (snow, ice, mud, attachments, equipment, stickers, etc.), electromagnetic (EM) or ultrasonic interference, misaligned bumpers, extreme temperatures, unusual lighting, etc. For example, consider a simple example of a car and a bicycle approaching an intersection from different directions. An AI in a vehicle may not be able, with current LIDAR technology or vehicle-mounted cameras to reliably detect a bicycle partially obscured from view. If a bicyclist is traveling quickly toward an intersection, the vehicle may not be able to detect the bicyclist until they are about to unexpectedly meet (crash) in the intersection. This means that the AI and driver (if present and alert) will have limited time to assess the risk and respond to the threat of a bicycle collision. Further, it will be appreciated under some circumstances the car may fail to recognize objects in its environment. A well-publicized fatal accident is that of a Tesla car that failed to slow down when a truck pulled across its path and the truck's coloration (white-colored) blended in with the background environment (similarly-colored sky). Although the exact reason for why the car did not recognize the truck has been a topic of discussion, such sensory trouble suggests that, if possible, seeking response recommendations from remote viewers and/or other resources external to the vehicle will improve AD/SAD/ADAS vehicle movement.

For reference, "levels" have been associated with mobile devices, such as vehicles. Level 0 represents no automation. Level 1 provides some driver assistance, such as adaptive cruise control that may adjust steering or speed (but not both simultaneously). Level 2 provides partial automation, such as braking, acceleration, or steering, but the driver is expected to remain in control and respond to traffic, traffic signals, hazards, etc. Level 3 provides conditional automation, where a car may generally control its movement but a driver is expected to be able to take control at any moment. It will be appreciated while the driver is expected to remain alert, it is likely drivers will not be alert after some time of letting the car be in control (people get bored). Level 4 provides high automation, so that, for example, in restricted or otherwise well-understood environments (e.g., while on a highway or well-monitored environment such as FIG. 1), a mobile device may be entirely self-controlled with no driver involvement. But when on side streets a driver would be required to control the car. Level 5 represents the current pinnacle of autonomous devices where full automation is provided and, for example, a car, should in theory be capable of operating on any road in any conditions a human driver could operate.

The following discussion will cover adding other inputs that may be external to a mobile device to assist the device with having a better model from which to make automation decisions, e.g., to self-direct its movement or take other action. It will be appreciated while discussion is focusing on mobile devices, the discussion may include devices and/or mechanisms that may control movement of another device. It will be appreciated a mobile device may utilize many different techniques for object and other data recognition in input data, such as visual input data. See for example, Practical object recognition in autonomous driving and beyond; Teichman & Thrun; Advanced Robotics and its Social Impacts (2011) pgs. 35-38 (DOI: 10.1109/ARSO.2011. 6301978). Or Object recognition and detection with deep learning for autonomous driving applications; Uçar, Demir, & Güzeliş (Jun. 2, 2017) accessible at Internet uniform resource locator (URL) doi.org/10.1177/0037549717709932. Or Towards Fully Autonomous Driving: Systems and Algorithms; Levinson, Askeland, et. al., accessible at URL www.cs.cmu.edu/~zkolter/pubs/levinson-iv2011.pdf. In some embodiments, through use of recognition systems and/or remote driver input, a mobile device may independently, or cooperatively with external resources, make decisions on movement of the mobile device. Errors in the image detection or other sensor interpretation mistakes that led to the Tesla crash may cause crashes for any level 3 or higher device, and hence remote viewer recommendations may facilitate mobile device operation in complex environments, such as ones with fast moving threats, or speculated threats that have not yet occurred.

FIG. 1 illustrates an exemplary environment 100 showing an intersection 102 with various potential threats to operation of a mobile device, such as a vehicle 104. In this embodiment, the vehicle is assumed to be an autonomous or semi-autonomous vehicle (AD/SAD). For example, an autonomous (e.g., level 4 or 5) or semi-autonomous (e.g., level 3) vehicle, such as illustrated vehicle 104, is expected to have a variety of sensors 106, 108, that are used to identify the car's local environment and provide data required for the device to navigate, e.g., on a road 110. As illustrated the vehicle is approaching an intersection 102 from one street 110, and a bicycle 112 is approaching the intersection from another street 114.

It will be appreciated the vehicle may augment its sensors with input from other sources, e.g., building cameras 116-120, or intersection camera 122 and the vehicles AI may use its sensors and external sensors in an effort to improve its decision-making ability. In some embodiments, a recognition system, employing video analytic algorithms and domain specific rules, may be used to analyze an environment, including identifying types of objects in the vicinity of the sensor, object movement, speed, trajectory, scene classification, content analysis, movement prediction, etc., and in the case of vehicles, domain specific analysis such as lane detection, speed detection, navigation violations, erratic behavior, etc. and use this analysis to identify activity on the streets 110, 114. Based on the analysis, potentially dangerous situations, such as an imminent potential collision, may be predicted. Unfortunately, decisions made by the AI are limited to the training the AI has received and the algorithms employed. Sometimes this is not sufficient, such as in the notorious accidents where circumstances were complex and the AI could not reliably determine a proper course of action. In such situations the decisions of the AI may be augmented (or replaced) with decisions by one or more remote viewers (RVs) that are asked to view and respond to a current environment 124 of a vehicle.

As will be discussed below, the current environment (or speculative variation thereof) may be packaged as a construct that represents the environment sensed by a vehicle and presented to one or more remote viewers to obtain their recommended response to the environment, e.g., to provide a driving response to the threat of collision with a bicyclist.

Figure 2:
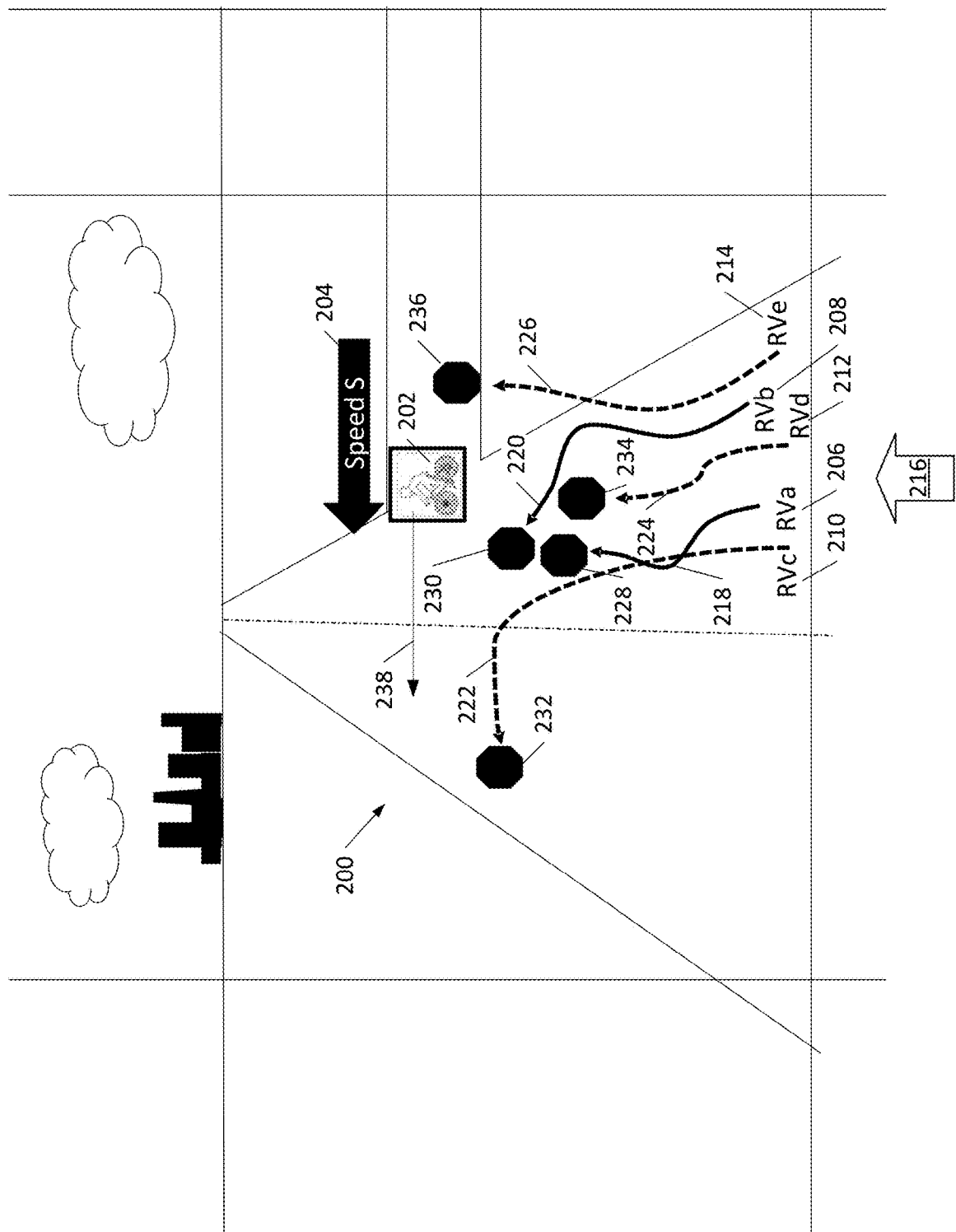
FIG. 2 illustrates an exemplary environment 200 illustrating a bicyclist 202 entering an intersection.

FIG. 2 illustrates an exemplary environment 200 illustrating a bicyclist 202 entering an intersection. It is assumed the bicyclist is "suddenly" entering the intersection as a speed "S" 204. As discussed above, while an AD/SAD may competently navigate normal driving conditions, if something sudden or unusual occurs, the AI may unsure how best to respond or may make a less than optimal decision. Therefore in one embodiment, input from remote viewers RVa-RVe 206-214 is solicited. It will be appreciated the bicyclist is simply an exemplary threat to the vehicle and that other threats are intended. For example, the threat to a vehicle may be the result of object recognition identifying an object (e.g., a spare tire) on the back of a truck bed in front of a vehicle, and the AI may seek RV input on how to respond to the object falling off the truck. The concept here is to solicit input from one or more remote viewer (RV) in any circumstance where the AI is unsure of a clear response to make in a given situation, or where the AI can predict a potential threat that is not happening yet. It is further contemplated that a RV may be solicited whenever a mobile device, e.g., a vehicle or other device, leaves a well-known area such as FIG. 1 with its infrastructure to support an AD/SAD.

In the illustrated embodiment, the AI for a mobile device such as a vehicle can identify the bicyclist 202 entering the intersection as the vehicle is moving on the road as indicated by the arrow 216. The AI seeks input from remote viewers 206-214. It is assumed the AI provides the remote viewers with a model or other information representing the threat to the vehicle (rapid arrival of the bicyclist). Providing a model of the vehicle's environment 200 may be performed in real-time, or some or all of the environment (e.g., a running model) for the vehicle may be maintained, for example, on a remote machine. Remote viewers may access the environment to review the situation needing remote viewer input. After reviewing the environment, the AI may incorporate remote viewer responses into its decision-making to determine a proper course of action. It will be appreciated there may be a driver in the vehicle and the driver may be performing actions to control movement of the vehicle. Depending on the circumstances the AI may defer to the driver, or for safety the AI may elect to override the driver's driving decision(s).

As illustrated, the five remote viewers 206-214 monitor the environment 200 and provide recommended driving responses to the threat. As illustrated each remote viewer recommends various driving paths 218-226 leading to the vehicle stopping at various locations 228-236. The variety of the illustrated remote viewer recommendations is to illustrate how different people may respond to the same circumstance in a different way. And while it is assumed for the illustration that all remote viewers are people responding to the environment, it will be appreciated that some or all of the remote viewers may be another AI (perhaps with more computational resources than available to a mobile device) or other environment such as a specialized machine for receiving and processing threat scenarios. An AI in a mobile device may apply some reasoning to discard some of the responses. For example, remote viewer RVc 210 has recommended swerving into the lane for oncoming traffic. And while that is a theoretical response the AI for the mobile device receiving that suggestion may consider discarding it unless there are no other viable alternatives. Similarly, it's possible that the suggestion from remote viewer RVe 214 is another outlier result that should be discarded since it suggests leaving the roadway and provides a stopping point 236 on the bicyclists' road. However since the bicyclist is heading into the intersection and the proposed stopping point is behind the bicyclists position, it's clear this is a valid avoidance of a collision with the bicyclist—but the AI would have to evaluate conditions at the proposed stopping point 236, e.g., there may be people, cars, or other things that would also have to be avoided and hence the RVe proposal is not safe to implement.

The recommendations from RVc 210 and RVe 214 were referred to as "outliers" since if one reviews all five proposed routes 218-226 and stopping points 228-236, it can be seen (and analyzed by an AI) that remote viewers RVa 206, RVb 208, RVd 212 all provided responses that are statistically clustered together in that they share common identifiable characteristics, e.g., all three results maintain the mobile device, e.g. the vehicle, within its traffic lane, and all three have the mobile device stopping before crossing a projected path 238 for the bicyclist. In one embodiment an AI may correlate the various remote viewer recommendations to identify the noted outlier responses, and the AI may also correlate its internal recommendation against the remote viewer recommendations facilitate making a determination of what course of action to take.

For example if we assume that remote viewer RVb 208 illustrates the mobile device's AI planned response, the AI may, on receiving the other results, determine that remote viewer proposal RVd is a more optimal solution since it appears to avoid a collision while also maintaining a larger distance from the bicyclist. The larger distance may be considered a meaningful factor in the decision-making process since while the bicyclist is predicted to be on path 238, the bicyclist may in fact swerve or turn or take some other action bringing it closer to the mobile device seeking to avoid the bicyclist. It will be appreciated that the AI, being a digital device, will process events in discrete units/moments of time and at any given time between identifying a threat and taking action, the AI may continually prepare a best course of action. In effect just as each of the remote viewers 206-214 represent multiple different responses to a perceived threat, the AI may itself be creating multiple proposals that may be compared with and correlated with the remote viewer recommendations.

It will be appreciated the nature of the mobile device, and its configuration (braking type, tire type, suspension or other vehicle information) may allow predicting handling, stopping distances, etc. and this information may be factored into making the response to the threat. Further, volatile (temporary) factors such as the presence of a driver, occupant, or an infant, etc. may all factor in the response to take. For example, it may be that stopping point 234 is best when a mobile device has no passengers, whereas stopping point 230 though closer to the predicted bicyclist path 238 might be the safest when the mobile device has passengers. It will also be appreciated characteristics of a driver may also be used as a factor in making a response to the threat. For example, if there is a driver of a vehicle traveling 216 on a roadway, and the driver appears distracted, then the driver response may be discounted or possibly ignored. Similarly, if a remote viewer is deemed distracted, or for some reason was slow in responding, then that might invalidate the recommendation from that remote viewer.

FIG. 3 illustrates an exemplary flowchart 300 for soliciting recommendations from one or more remote viewers. It is understood some people are not the most reliable observers when they are in autonomous vehicles, particularly when a threat occurs and safety requires fast reaction times. One reason for slow response times is a driver may become distracted or bored. To assist decision-making, whether made by the driver or by an AI for a mobile device, remote viewers will be solicited for input for responding to a threat. In one embodiment, remote viewer reaction times are optimized by, in one embodiment, time-compressing (speeding up) their experience of the environment and/or threat facing a mobile device. It will be appreciated the environment and/or threat presented to a remote viewer may be what is actually occurring, or it may be a virtual construct of something that might occur, or a combination of the two.

For example, assume a mobile device, such as a vehicle or other machine, is traveling 302. If 304 the vehicle is in a well-defined area, such as driving down a highway, during the day, with clear weather and light traffic. This is essentially optimal driving conditions and therefore there is limited need for remote viewer input. In one embodiment, statistical and/or historical models may be used to determine that a given roadway (or other area), is a well-defined area with optimal driving conditions. Therefore, in this embodiment a single (or limited number) remote reviewer is identified 306. Once identified a construct (e.g., a representation of the environment associated with the vehicle) is prepared 308. The construct may represent a literal data feed of sensor data available to the vehicle, e.g., so the remote viewer sees what the vehicle sees, or it may represent the environment in another format. For example the construct might just be a wireframe representation of the environment, as was illustrated in FIG. 2. This presentation format may facilitate data transfers since data connection speed between the vehicle and external sources may be constrained. The construct may also be prepared with virtual elements in case an AI wants to perform what-if testing for various risk assessments. For example, if the vehicle is following a truck with items (such as a tire) on the back of the truck the construct may be augmented with an animation of the tire or other object falling off the truck in various ways (e.g., straight back, bouncing to the left, bouncing to the right, having various speeds and trajectories, etc.). This potential threat may be incorporated into the construct and allow the one or more remote viewer to respond to the threat. In such fashion the AI for a vehicle may get ahead of potential risks. Once prepared the construct is sent 308 to the remote viewer(s) for receiving a recommended response, e.g., to receive 310 proposed responses to a threat as discussed with respect to FIG. 2.

As discussed above, the AI for a mobile device may receive multiple responses to a particular situation, including from its internal decision-making system, from the remote viewer(s) sent 308 a construct, from external infrastructure, e.g., machines associated with a roadway, region, area, etc. tasked with assisting AD/SAD vehicles; from other mobile devices, e.g., other vehicles sharing the road; from aerial drones or other flying equipment; from pylons, cellular-infrastructure supporting mobile device operation, etc. The AI may process and take an informed action 312 by analyzing responsive proposals to the current environment for the vehicle, such as by correlating them as discussed in FIG. 2, and take action.

FIG. 4 illustrates an exemplary flowchart 400 illustrating selecting an available remote viewer. It will be appreciated using remote viewers (or remote drivers), if their assistance can be obtained in time to respond to a threat to a mobile device, may increase safety of operation for mobile devices. Automobile vehicles are a well-known example of devices that have had high-profile accidents that suggest more can be done to improve their operation. However since need for remote viewer input is often time critical (unless it is a what-if scenario as discussed above in FIG. 3), remote viewers should not be selected unless they are immediately available and deemed capable in the current situation to be reviewed.

Thus, with respect to FIG. 3 operation 308 sending the construct to the remote viewer, assuming an entity or machine acts as a controller, the controller is assumed to be tracking remote drivers to identify 402 remove viewers that are online and theoretically available to receive a construct and recommend a driving decision. It will be appreciated while the illustrated embodiment focuses on driving, this is for expository convenience and reader familiarity, and the teachings herein are applicable to other situations where access to remote viewer input may be helpful. For example, remote viewers may assist with a medical procedure (such as though operation of a robotic tool) if an in-person actor is not capable or confident in performing a procedure. Or, remote viewers may help in a security situation requiring a tactical response, where remote viewers may propose an action in by way of an interface they are using, including viewing a construct showing machinery such as guns or other equipment.

In order to effectively communicate with remote viewers, it is assumed a "fast", e.g., sub one millisecond, communication pathway exists to link a mobile device with remote viewers. One exemplary pathway that may be utilized by mobile devices, such as vehicles, is "5G" communication technology as discussed in FIG. 7. However, as discussed in FIG. 7 it is understood that there are many other communication technologies to enable communication between a mobile device and a remote viewer and/or a central controller that may be coordinating the remote viewers or access to the remote viewers. Further on "slow" or congested networks, remote viewers may be prioritized based at least in part on data throughput with the vehicle to ensure the fastest responders are responding. It will be appreciated a peer-to-peer configuration may be used to match up remote viewers with a mobile device, e.g., there does not have to be a central controller or other machine coordinating access or communication with remote viewers.

After identifying 402 available remote viewers, a subsequent operation is to identify 404 which remote viewers are alert. As discussed previously, attentions wax and wane and even though a remote viewer may be online, a specific viewer may be distracted or otherwise deemed incapable of providing an immediate response to a threat situation present in the FIG. 3 construct 306. In one embodiment, even if a remote viewer is considered alert, it may be known that the current threat situation is not one the remote viewer is understood to handle well. For example, recall FIG. 2 remote viewer RVc 210 that suggested a stopping point 232 in oncoming traffic. That remote viewer may be flagged as not being the best candidate if others are available to respond to a similar threat in a construct. Thus for a remote viewer a test may be made to determine if 406 the remote viewer matches the threat scenario. If not processing may loop back to identify 404 another remote viewer until one is found that matches. Note that although the illustrated embodiment shows a single operation for identifying remote viewers and test for a match it will be appreciated that this may be performed in large scale parallel processes to maximize identifying valid viewers for a construct needing review. Further it will be appreciated by those skilled in the art that the identifying available and alert remote viewer operations, while presented here as two simple operations, 402, 404, may represent a cycle of locating accessible remote viewers and performing operations to test remote viewers for alertness, responsiveness, acuity, etc.

After identifying remote viewers, a format for the construct is selected 408. It will be appreciated different remote viewers may be tested and/or otherwise reviewed to determine what type of interface yields faster response times. For example, some people would respond well in a driving situation to a somewhat realistic representation of what a driver of the vehicle would see, and the remote viewer would respond to a perceived threat as if they were driving. Others, however, may perform better if a construct format showed a video game environment, where the content of the "game" represents a threat scenario, but the presentation and controller for the in-game vehicle are presented as an interactive video game. Note that in the game environment it might simplify the data needed to be transmitted as only object position information needs to be shared, not actual representations of the environment for a vehicle. In yet another embodiment, the format may look nothing like a driving environment, it could look like an abstract game or set of symbols. The actual presentation format does not matter so long as the threat can be represented in some way such that a recommendation may be made.

After selecting 408 the remote viewers are provided 410 access to the construct for review. It will be appreciated that various techniques may be employed to provide the construct to a remote viewer. For example, remote viewers may be provided a link, uniform resource locator (URL), or the like, to direct the remote viewer to a location to obtain data for the construct. Or, data for the construct may be provided directly to a remote viewer, or some combination of both. Considering most requests for recommendation from a remote viewer is a time of the essence situation, it will be appreciated the fasted available options for providing constructs to remote viewers may be used. In one embodiment, an ongoing data transfer is made from a mobile device to a coordinator (not illustrated), e.g., coordinating machine, so that when the need arises for a recommendation, a smaller delta of information over a previous data transfer need be sent to provide an accurate construct for review. The remote viewer may use a variety of equipment to access a construct, including simulation devices (mock cars or motorcycles), virtual reality equipment (goggles, gloves, controllers, and the like), computers (desktops, handhelds, etc.) or any other device suitable for presenting the construct.

While all remote viewers may be provided 410 access to a similar or possibly identical construct, see, e.g., the FIG. 2 discussion, it may be desirable to provide remote viewers with different versions of a construct. As noted above, an AI for a mobile device may seek to test different threat scenarios. For example, assume the AI is integrated in an autonomous vehicle that is driving down a road and finds itself behind a truck with a flatbed trailer. The AI easily identifies the truck. Further, the AI identifies people and/or objects on the flatbed of the truck that are moving independently of the flat bed, e.g., objects and/or people are rolling or sliding. The AI may forecast a risk that one or more objects or people may fall off of the truck's trailer. Since remote viewers may be presented in their construct with an arbitrary reflection of the environment for a mobile device, some or all remote viewers may be presented with a view of the road, path, etc., and in one embodiment, eye scanning technology used to identify areas and/or objects of interest by extrapolating from where remote viewer's eyes focus within the construct. Remote viewer focus may be aggregated, and new threats may be identified or potential threats reinforced. If, for example, multiple remote viewers focus on a truck tire balanced precariously on the back of a trailer, the AI may plan for that risk. Since a specific threat has not been identified, in one embodiment in FIG. 3 item 308 the AI develops constructs for different threat scenarios that play out for the remote viewers. This allows the AI to resolve various what-if situations. For example, one remote viewer may be shown a construct where a person falls off the truck, in another construct a remote viewer sees a tire bounce off the truck going toward the viewer (that is, toward the theoretical position of the vehicle), in yet another construct the remote viewer sees the tire bounce into traffic, etc.

Various recommendations from the remote viewers may be, in the FIG. 3 embodiment, for example, received 318 and the AI may use the recommendations to establish a reaction plan if one of the threats occurs and the AI needs to take action 312. If an AI determines it needs remote viewer recommendations as soon as possible, such as when a person is detected running in front of a vehicle, or the FIG. 2 scenario where a bicyclist is rapidly approaching an intersection, in one embodiment the AI tests if 412 the remote viewer should be presented with an accelerated construct. If yes, then the AI may provide 414 a predictive construct that animates or otherwise presents an expected threat scenario, or as discussed above, multiple possible threat scenarios showing activity at a faster rate than real time. Remote viewers, using whatever interface and construct format best suits them, are now presented with a construct that may be operating many times faster than real-time. In one embodiment the AI may scale the speedup based on characteristics of the perceived threat, e.g., is the threat moving quickly, is it likely to move faster, does the AI need more time because the environment around the vehicle is complicated, etc. Thus, for example, some remote viewers may perceive a sudden increase of apparent driving speed from 55 mph to 100 mph, 200 mph, etc. The perceived speedup may be arbitrary in an effort to get a recommendation in response to the construct as quickly as possible based on circumstances. By speeding up a remote viewer may engage and respond to a construct before the AI needs to make a driving adjustment. If 412 the construct does not need acceleration, then a normal, e.g., near real-time or possibly slower, construct may be provided 416 for receiving a proposed course of action.

Figure 5:
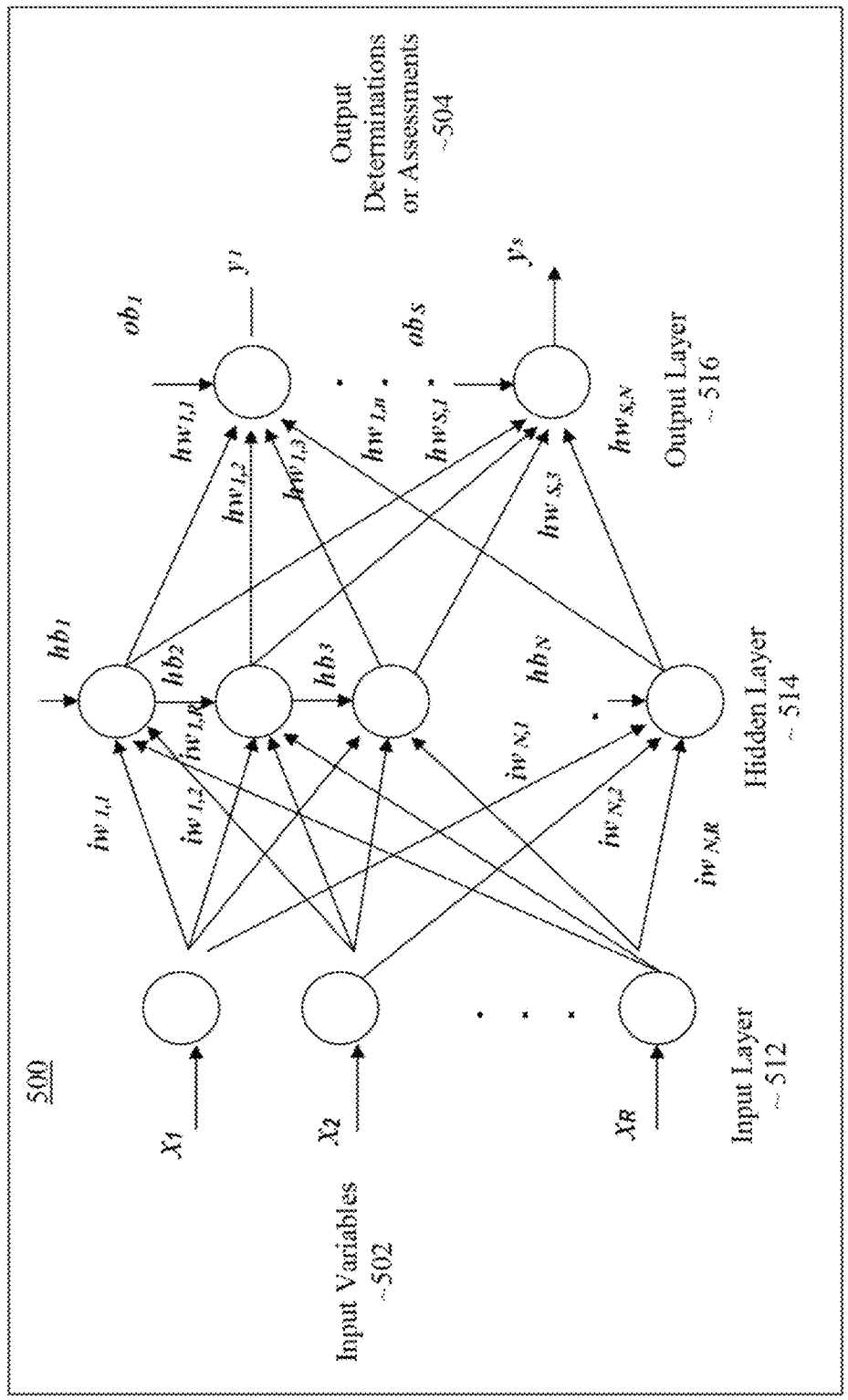
FIG. 5 illustrates an exemplary neural network, according to various embodiments.

FIG. 5 illustrates an exemplary neural network, according to various embodiments. As discussed above an AI may be wholly and/or partially controlling operation of a mobile device, and the AI is expected to interact with and evaluate recommendations from remove viewers. In one embodiment, the AI is implemented at least in part with a neural network 500. It will be appreciated there are many different versions of neural networks that may be used. In the illustrated embodiment, the neural network may be a multilayer feedforward neural network (FNN) comprising an input layer 512, one or more hidden layers 514 and an output layer 516. Input layer 512 receives data of input variables ($x_i$) 502. It will be appreciated an Artificial Neural Network (ANN) is based on connections between interconnected "neurons" stacked in layers. In a FNN, data moves in one direction, without cycles or loops, where data may move from input nodes, though hidden nodes (if any), and then to output nodes. The Convolutional Neural Network (CNN) discussed above with respect to operation of the FIG. 1 AI 122 is a type of FNN that works well, as discussed, with processing visual data such as video, images, etc.

Hidden layer(s) 514 processes the inputs, and eventually, output layer 516 outputs the determinations or assessments ($y_i$) 504. In one example implementation the input variables ($x_i$) 502 of the neural network are set as a vector containing the relevant variable data, while the output determination or assessment ($y_i$) 504 of the neural network are also as a vector. A Multilayer FNN may be expressed through the following equations:

$$ho_i = f(\Sigma_{j=1}^{R}(iw_{i,j}x_j)+hb_i), \text{ for } i=1,\ldots,N$$

$$y_i = f(\Sigma_{k=1}^{N}(hw_{i,k}ho_k)+ob_i), \text{ for } i=1,\ldots,S$$

where $ho_i$ and $y_i$ are the hidden layer variables and the final outputs, respectively. f( ) is typically a non-linear function, such as the sigmoid function or rectified linear (ReLu) function that mimics the neurons of the human brain. R is the number of inputs. N is the size of the hidden layer, or the number of neurons. S is the number of the outputs. The goal of the FNN is to minimize an error function E between the network outputs and the desired targets, by adapting the network variables iw, hw, hb, and ob, via training, as follows:

$$E = \Sigma_{k=1}^{m}(E_k), \text{ where } E_k = \Sigma_{p=1}^{S}(t_{kp}-y_{kp})^2$$

where $y_{kp}$ and $t_{kp}$ are the predicted and the target values of pth output unit for sample k, respectively, and m is the number of samples.

In some embodiments, an environment implementing a FNN, such as the AI of FIGS. 1-4, the AI processing may include a pre-trained neural network 500 to determine whether a mobile device, such as the FIG. 1 vehicle 104, is facing a threat and how the AI may, based on current learning, determine a possible responsive course of action to the threat. The input variables ($x_i$) 502 may include objects recognized from the images of the outward facing cameras, and the readings of the various mobile device sensors, such as accelerometer, gyroscopes, IMU, and so forth. Input variables may also correspond to remote driver recommendations as discussed with respect to FIG. 3 item 308. The output variables ($y_i$) 504 may include values indicating true or false for the mobile device facing an imminent threat, as well as to whether AI-proposed or remote driver-proposed recommendations appear to resolve a current actual or projected threat to the mobile device, as well as to what extent a proposal appears to be a valid response to a threat.

The network variables of the hidden layer(s) for the neural network for determining whether the mobile device is involved in an incident/accident, or is in threat of being in an incident/accident, are determined at least in part by training data. In one embodiment, the FNN may be fully or partially self-training through monitoring and automatic identification of events. The FNN may also be trained by receiving the recommended action(s) provided by one or remote viewer, as well as by the result from performing a recommendation, e.g., driving as suggested by one of the FIG. 2 remote viewers. It will be appreciated an AI may share its experiences with other AIs so that they may cross-train each other as they accumulate experience.

In one embodiment, the mobile device includes an occupant assessment subsystem (see, e.g., FIG. 4 item 404 discussion) that may include a pre-trained neural network 500 to assess condition of an occupant. The input variables ($x_i$) 502 may include objects recognized in images of the inward looking cameras of the mobile device, sensor data, such as heart rate, GSR readings from sensors on mobile or wearable devices carried or worn by the occupant. It will be understood the mobile device may have associated therewith the neural network 500 operating in conjunction with or independent of an AI associated with a person or other external machine. The output variables ($y_i$) 504 may include values indicating selection or non-selection of a condition level, from healthy, moderately injured to severely injured.

The network variables of the hidden layer(s) for the neural network of occupant assessment subsystem may be determined by the training data.

In some embodiments, a mobile device assessment subsystem may include a trained neural network 500 to assess condition of the mobile device. The input variables ($x_i$) 502 may include objects recognized in images of the outward looking cameras of the mobile device, sensor data, such as deceleration data, impact data, engine data, drive train data and so forth. The input variables may also include data received from remote viewers, as well as any external AI having data related to monitoring the mobile device and thus have assessment data that may be provided to the mobile device (e.g., a smart city may have an AI that may provide information to the mobile device). The output variables ($y_i$) 504 may include values indicating selection or non-selection of a condition level, from fully operational, partially operational to non-operational. The network variables of the hidden layer(s) for the neural network of mobile device assessment subsystem may be, at least in part, determined by the training data.

In some embodiments, external environment assessment subsystem may include a trained neural network 500 to assess condition of the immediate surrounding area of the mobile device. The input variables ($x_i$) 502 may include objects recognized in images of the outward looking cameras of the mobile device, sensor data, such as temperature, humidity, precipitation, sunlight, and so forth. The output variables ($y_i$) 504 may include values indicating selection or non-selection of a condition level, from sunny and no precipitation, cloudy and no precipitation, light precipitation, moderate precipitation, and heavy precipitation. The network variables of the hidden layer(s) for the neural network of external environment assessment subsystem are determined by the training data.

In some embodiments, the environment providing the FNN may further include another trained neural network 500 to determine an occupant/mobile device care action. Action may be determined autonomously and/or in conjunction with operation of another AI, or remote viewer recommendation based on accessing a construct related to the environment of the mobile device. The input variables ($x_i$) 502 may include various occupant assessment metrics, various mobile device assessment metrics, various remote viewer assessment metrics, and various external environment assessment metrics. The output variables ($y_i$) 504 may include values indicating selection or selection for various occupant/mobile device care actions, e.g., brake, swerve, slow-down, pull over, move to roadside and summon first responders, stay in place and summon first responders, drive to a hospital, etc. Similarly, the network variables of the hidden layer(s) for the neural network for determining occupant and/or mobile device care action are also determined by the training data. In FIG. 5, for illustration simplicity, there is only one hidden layer in the neural network. In other embodiments, there may be many hidden layers. Further, the neural network may be in other types of topology, such as Convolution Neural Network (CNN) as discussed above, Recurrent Neural Network (RNN), and so forth.

Figure 6:
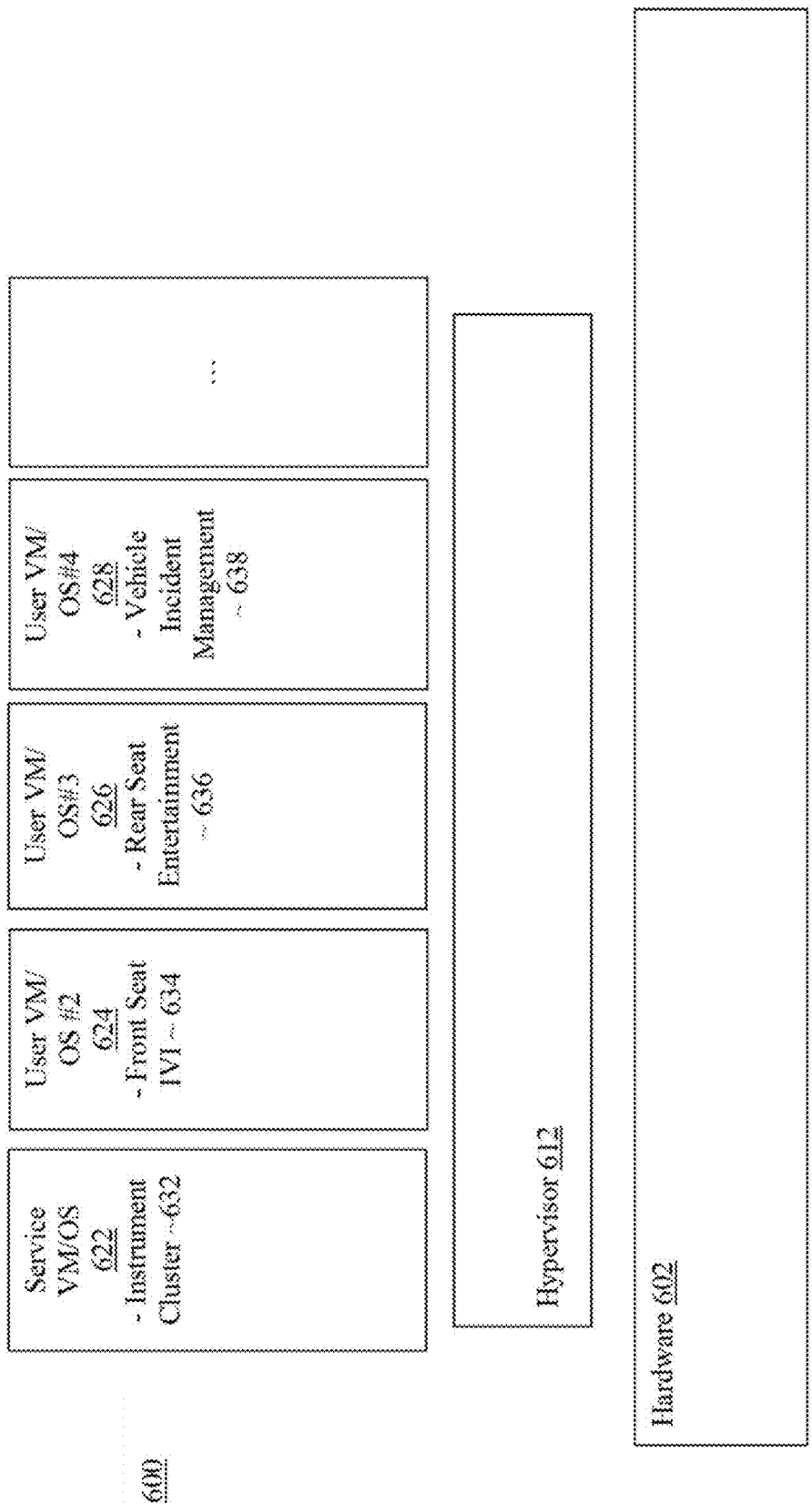
FIG. 6 illustrates an exemplary software component 600 view of a mobile device AI and/or control software, according to various embodiments.

FIG. 6 illustrates an exemplary software component 600 view of a mobile device AI and/or control software, according to various embodiments. As shown, components may include includes hardware 602 and software 610. Software 610 includes hypervisor 612 hosting a number of virtual machines (VMs) 622-628. Hypervisor 612 is configured to host execution of VMs 622-628. The VMs 622-628 include a service VM 622 and a number of user VMs 624-628. Service machine 622 includes a service OS hosting execution of a number of instrument cluster applications 632. User VMs 624-628 may include a first user VM 624 having a first user OS hosting execution of front seat infotainment applications 634, a second user VM 626 having a second user OS hosting execution of rear seat infotainment applications 636, a third user VM 628 having a third user OS hosting execution of a mobile device incident management system including applications for obtaining remote viewer recommendations, threat assessment, and so forth.

Except for the AI threat assessment and using remote viewer recommendations of the present disclosure, elements 612-638 of software 610 may be any one of a number of these elements known in the art. For example, hypervisor 612 may be any one of a number of hypervisors known in the art, such as KVM, an open source hypervisor, Xen, available from Citrix Inc, of Fort Lauderdale, FL., or VMware, available from VMware Inc of Palo Alto, CA, and so forth. Similarly, service OS of service VM 622 and user OS of user VMs 624-628 may be any one of a number of OS known in the art, such as Linux, available e.g., from Red Hat Enterprise of Raliegh, NC, or Android, available from Google of Mountain View, CA.

Figure 7:
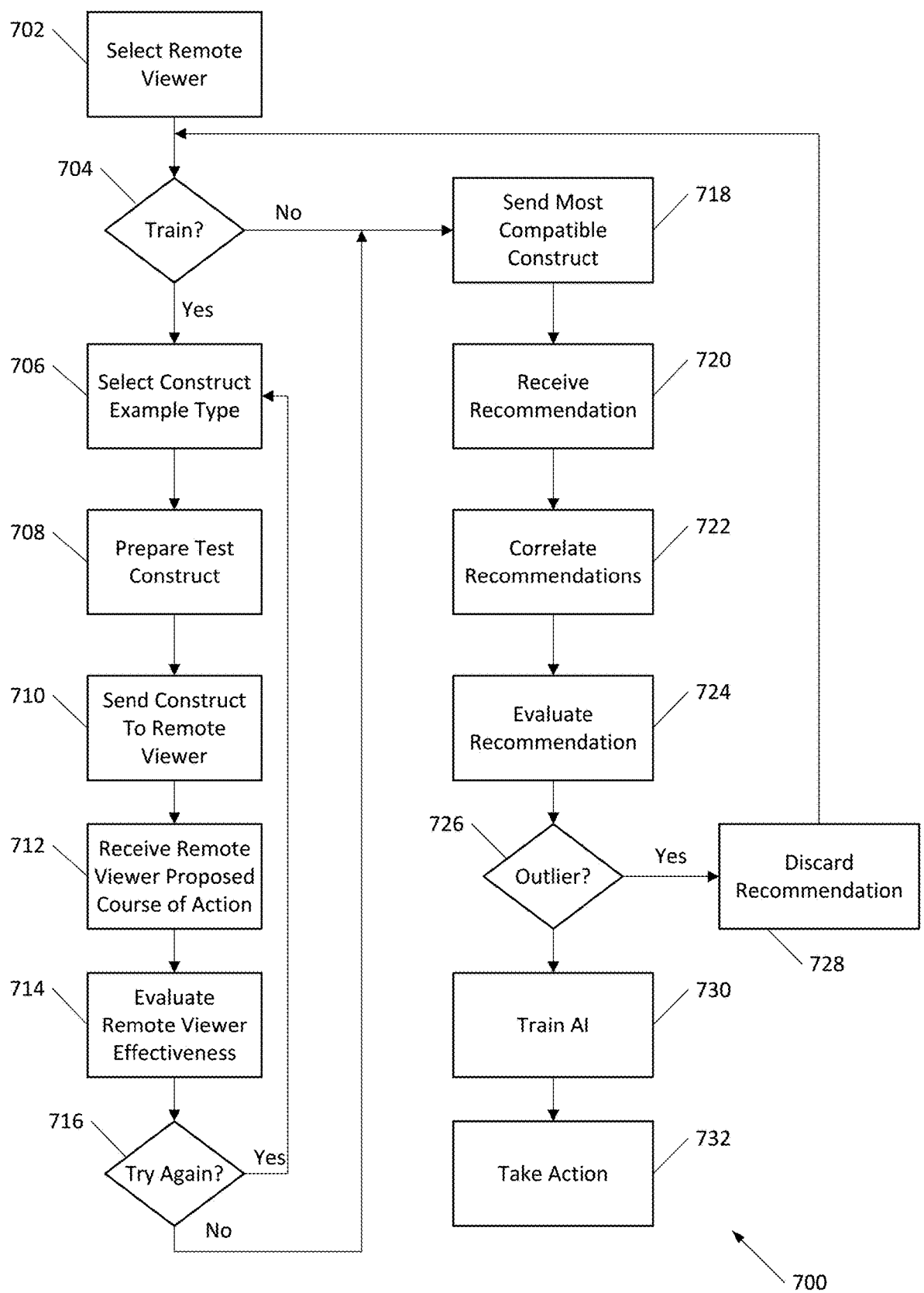
FIG. 7 illustrates an exemplary training system 700 for determining a preferred construct format to send to a remote viewer.

FIG. 7 illustrates an exemplary training system 700 for determining a preferred construct format to send to a remote viewer. It will be appreciated this is a somewhat simplified discussion of training an AI, training a remote viewer, and learning which construct formats are compatible with a remote viewer. In particular while this is one embodiment for performing these actions in other embodiments these operations may be performed in parallel, perhaps massively, and the training of an AI occurring with respect to many remote viewers somewhat simultaneously. Also, there may be financial considerations for the remote viewers, e.g., the remote viewers may be paid for their effort. An AI may weigh interest in receiving a recommendation from a particular remote viewer, such as because the remote viewer is known to provide good recommendations, versus possible costs of utilizing that remote viewer.

It is assumed the remote viewers are reachable by a communication environment, which may be any combination of data networks or communication pathways described herein (see, e.g., FIG. 8 item 858 or FIG. 9 item 910), including combinations of cellular-type infrastructure and the Internet. It is also assumed, for simplicity, unavailable remote viewers, including those known to be not alert, sleepy, distracted, etc. are not contacted. A remote viewer may be selected 702 and in the illustrated embodiment, an AI will evaluate whether the remote viewer requires training. It will be appreciated that as discussed above, the AI of this figure may be the AI controlling a mobile device, it may be an external entity that validates, manages, oversees, etc. remote viewers, it may be an AI part of infrastructure associated with an environment in which the mobile device is traveling (such as smart city support services), it may be an AI in another device/machine/entity, or it may be a combination of some or all of these as AIs may operate individually and/or as a collective to resolve problems.

If 704 the selected remote viewer requires training, as may be the case if the remote viewer is new to providing remote viewer services, or if a mobile device is in an environment known to be unfamiliar to the remote viewer, or if a refresh is desired, or for any other reason, then a construct format is selected 706. A construct refers to creating a representation of an environment and/or threat and/or threat scenario with which an AI is concerned.

However, different people respond differently to the same input, e.g., for a particular construct presentation format, e.g., a video-like realistic presentation, some people may react well (quickly) whereas others may not. Therefore it is helpful to test remote viewers with different construct formats to see which formats work best in various circumstances. Some exemplary formats for presenting the environment and/or threat include live-feed video, simulated realistic (looks like live video), tunnel-vision, wireframe, infrared, color-shifted, gamification (e.g., presenting as a video game), abstract (e.g. translating the environment and/or threat into a different format such as a cube game to which a remote viewer may respond).

Taking gamification as an example, it will be appreciated the FIG. 2 intersection threat assessment may, for example, be translated into a skiing video game where a main character represents the position of a vehicle, the ski hill represents the roadway, rocks and obstacles represent road features/objects/etc. and another skier may represent the oncoming bicyclist. In this example the remote viewer may elect to ski the skier away from the other skier and in effect recommend one of the remote viewer driving recommendations as discussed in FIG. 2. Constructs may adjust presentation speed (e.g., be presented at a desired speed which may be real-time or arbitrarily faster or slower than real-time), as well as adjust color, sounds, and selectively change, remove, or replace colors and/or sounds, etc. as suits the remote viewer. Visual and/or auditory elements may be adjusted or highlighted to call out hot spots or areas of interest to an AI, for example, to mark or otherwise highlight portions of a construct that the AI consider to be a threat so that a remote viewer may concentrate on the threat.

After selecting 706 one of the construct formats and associated characteristics for its presentation, the test construct can be prepared 708 accordingly and sent 710 to the remote viewer. There is an issue regarding how to keep the remote viewer engaged/alert so that responses are immediate. In some embodiments a remote viewer is engaged in an ongoing simulation and/or training while awaiting an actual response task, and when a task is assigned the simulation is updated to incorporate or otherwise merge into the remote viewer experience the real-world issue needing a recommendation. In other embodiments, the remote viewer is simply serially tasked with constructs to which to respond and after responding to one the remote viewer is presented with another. This may get fatiguing, see, e.g., item 726. A proposed course of action, or recommendation, is received 712 from the remote viewer.

In one embodiment, the recommendation is evaluated 714 to determine how effective the current construct format is for the remote viewer. It will be appreciated that a remote viewer may be judged based at least in part on speed of response to the construct, apparent ability to appreciate the nature of the environment and/or threat presented, e.g., a response may indicate the remote viewer was responding to the wrong perceived threat. If this occurs, the remote viewer training may attempt highlighting threats, as well as switch to a different construct format, to see if that improves remote viewer competency. After testing a construct a test may be performed to determine if 716 testing should continue, and if so, processing may look back to selecting 706 another construct. In one embodiment, a new construct is prepared 708 and its operational/presentation features determined, based at least in part on an analysis of remote viewer performance on one or more previous construct tests.

After selecting 702 a remote viewer, if 704 training is not needed, e.g., the remote viewer has already been evaluated against various construct formats and permutations thereof, a remote viewer may be sent 718 a construct that was deemed most compatible with the remote viewer. Responsive to the construct, a recommendation from the remote viewer may be received 720 and as discussed previously, the recommendation may be correlated 722 (if desired) against other recommendations, if any, e.g., as discussed previously, in some circumstances such as well-defined areas of optimal viewing/driving conditions, there may be only one remote viewer. In some embodiments, the recommendation may be evaluated 726 to determine if 726 the recommendation appears to be an outlier. It will be appreciated a remote viewer may become fatigued, or that a particular construct format is no longer most compatible, or there may be an equipment concern, or other issue that may prevent a remote viewer from performing well. If the result is an outlier is can be discarded 728 and, depending on why the remote viewer is not performing well, processing could loop back to testing if 704 the remote viewer should be trained again to find a more compatible construct.

If 726 the recommendation does not appear to be an outlier, then the recommendation may be used to train 730 the AI so that it may update its neural network (see, e.g., FIG. 5) model regarding how to respond to the current environment and/or threat scenario facing a mobile device. The AI may also then take action 732 to respond to the environment and/or threat for which the AI was seeking input from one or more remote viewer. The decision engine for the AI can compare its default action against remote viewer recommendations and choose the response that best fits the current environment/threat. Although the illustrated embodiment shows operations occurring in a flowchart sequential manner, many operations may be performed in parallel and distributed across multiple AIs, machines, and peer devices (such as other vehicles driving along with a vehicle seeking input), and engage multiple remote viewers simultaneously.

Figure 8:
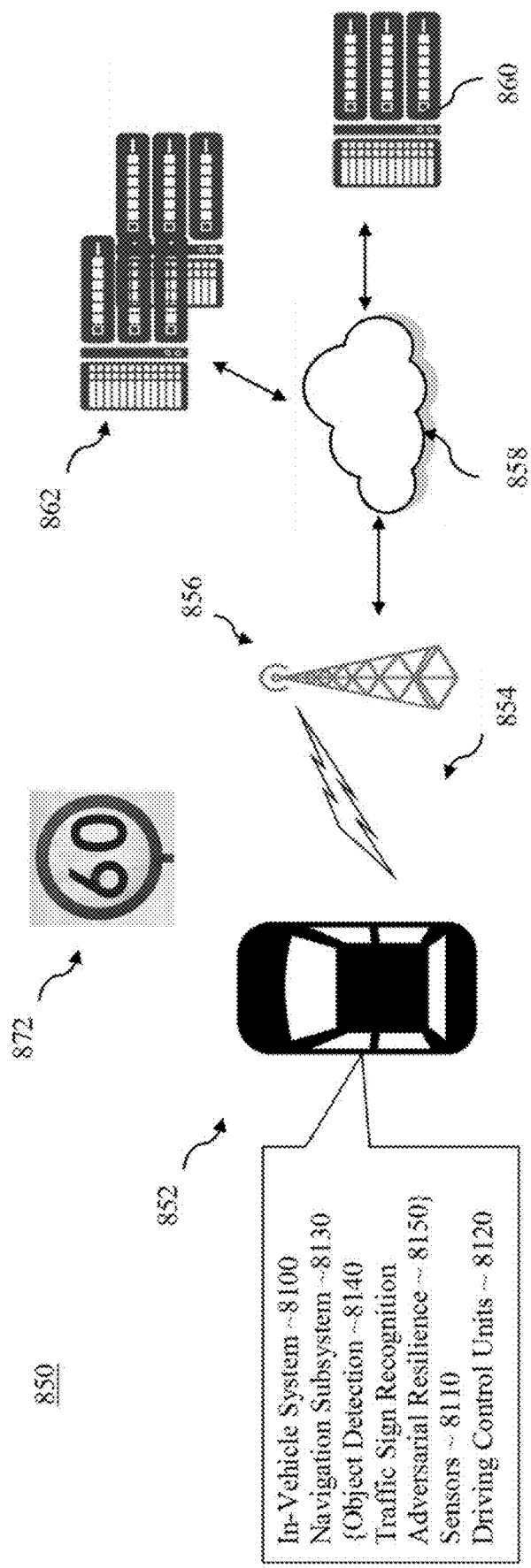
FIG. 8 illustrates an overview of an environment 800 for incorporating and using the remote viewer recommendation technology of the present disclosure, in accordance with various embodiments.

FIG. 8 illustrates an overview of an environment 800 for incorporating and using the remote viewer recommendation technology of the present disclosure, in accordance with various embodiments. As shown, for the illustrated embodiments, example environment 850 includes vehicle 852 having an engine, transmission, axles, wheels and so forth (not shown). Further, the vehicle includes in-vehicle system (IVS) 8100 having navigation subsystem 8130. In addition to the navigation subsystem, IVS 8100 may further include a number of infotainment subsystems/applications, e.g., instrument cluster subsystem/applications, front-seat infotainment subsystem/application, such as, a navigation subsystem/application, a media subsystem/application, a vehicle status subsystem/application and so forth, and a number of rear seat entertainment subsystems/applications (not shown).

Navigation subsystem 8130 is configured to provide navigation guidance or control, depending on whether vehicle 852 is a computer-assisted vehicle, partially, fully or semi-autonomous driving vehicle (CA/AD/SAD). In various embodiments, the navigation subsystem includes in particular, object detection subsystem 8140 and traffic sign recognition adversarial resilience (TSRAR) subsystem 8150. The term "adversarial" refers to intentional malicious modifications as well as small magnitude perturbations, e.g., from dirt, added to the traffic signs. Most computer-assisted or autonomous driving vehicles are using a form of deep neural networks (DNNs) based object detectors for recognition of traffic signs, and studies have shown DNNs are vulnerable to adversarial modifications of traffic signs, and this could mislead AI recognition systems and cause dangerous situations.

Object detection subsystem 8140 is configured with computer vision to recognize objects in front of vehicle 852, including traffic signs, e.g., traffic sign 872, the vehicle encounters, as it routes to its destination. The TSRAR subsystem is configured to provide the vehicle, and the navigation subsystem of IVS 8100 in particular, with improved resilience to adversarial traffic sign (such as the traffic sign, which is soiled), regardless whether the traffic signs were modified maliciously or unintentionally. Except for TSRAR subsystem 8150, navigation subsystem 8130, including the object detection subsystem, may be any one of a number navigation subsystems known in the art. In alternate embodiments, the TSRAR subsystem may be disposed outside navigation subsystem 8130.

In various embodiments, IVS 8100, on its own or in response to user interactions, communicates or interacts with one or more off-vehicle remote servers 860 or 862. In particular, the IVS, for providing traffic sign adversarial resilience, communicates with a server (such as remote server 860) associated with a traffic sign service to obtain reference descriptions of traffic signs at various locations. Additionally, the IVS may communicate with servers (such as remote server 862) associated with original equipment manufacturers (OEM) or authorities. Examples of OEM may include, but are not limited to, vendors of components of vehicle 852 or the vendor of the vehicle itself. Examples of authorities may include, but are not limited to, local or state law enforcement agencies, local or state transportation agencies, and so forth.

In various embodiments, IVS 8100 communicates with servers 860/862 via a wireless signal repeater or base station on transmission tower 856 near vehicle 852, and one or more private and/or public wired and/or wireless networks 858. Examples of private and/or public wired and/or wireless networks may include the Internet, the network of a cellular service provider, and so forth. It is to be understood that the transmission tower may be different towers at different times/locations, as the vehicle routes to its destination.

The vehicle 852, in addition to engine etc. described earlier, and IVS 8100, may further include sensors 8110 (see, e.g., FIG. 1 items 106, 108) and driving control units 8120. The sensors includes in particular one or more cameras to capture images of the surrounding of the vehicles, e.g., the surrounding in front of the vehicle. In various embodiments, the sensors may also include light detection and ranging (LiDAR) sensors, accelerometers, gyroscopes, global positioning system (GPS), and so forth. Examples of driving control units (DCU) may include control units for controlling engine, transmission, steering and brakes of the vehicle. Except for the remote viewer recommendation solicitation, review and utilization technology provided, much of the vehicle and its operation otherwise may be any one of a number of vehicles, from computer-assisted to partially or fully autonomous vehicles. Other features and aspects of a vehicle are described with reference to the other figures. It should be noted, while for ease of understanding, only one vehicle is shown, the present disclosure is not so limited. In practice, there may be multitude of vehicles equipped with an AI to solicit recommendations from remote viewers in accord with technology of the present disclosure, as well as through communication with one or more of a multitude of OEMs and/or multitude of authorities.

Figure 9:
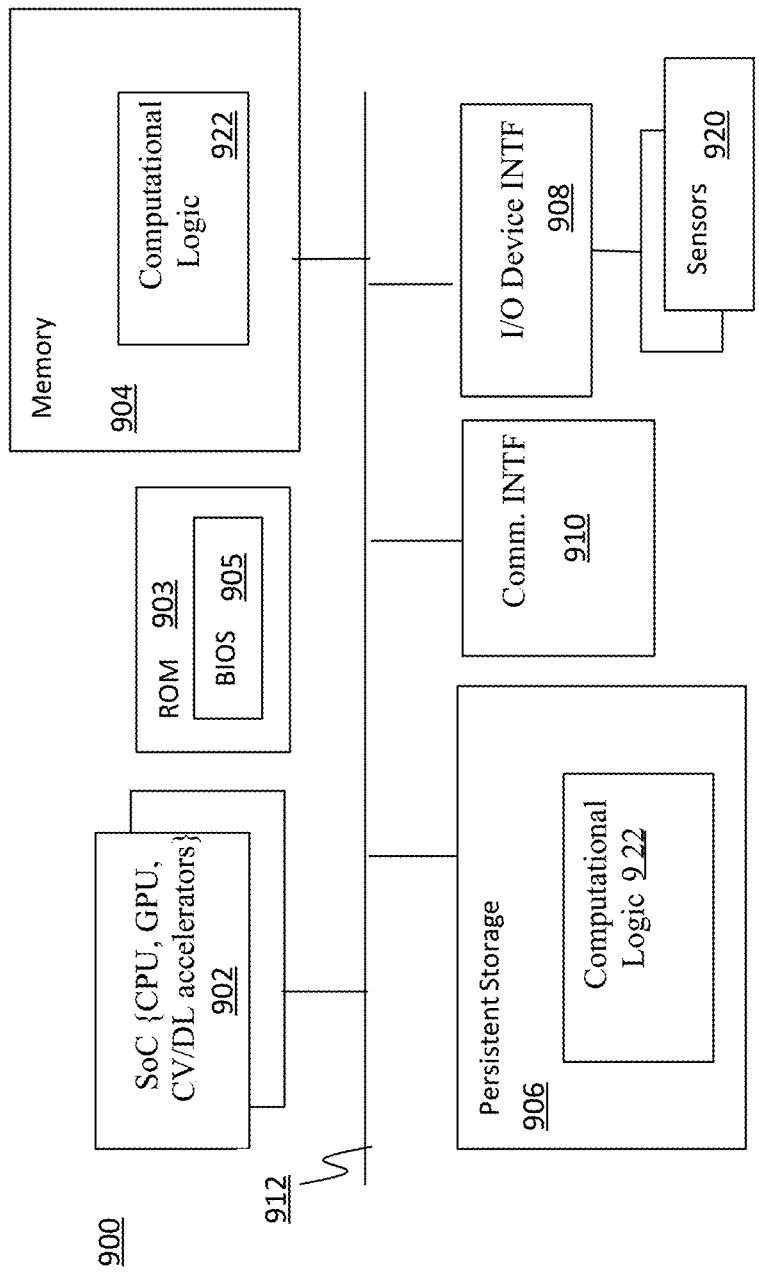
FIG. 9 an example computing platform that may be suitable for use to practice the present disclosure, according to various embodiments.

FIG. 9 an example computing platform that may be suitable for use to practice the present disclosure, according to various embodiments. As shown, computing platform 900, which may be FIG. 6 hardware 602, may include one or more system-on-chips (SoCs) 902, ROM 903 and system memory 904. Each SoCs 902 may include one or more processor cores (CPUs), one or more graphics processor units (GPUs), one or more accelerators, such as computer vision (CV) and/or deep learning (DL) accelerators. ROM 903 may include basic input/output system services (BIOS) 905. CPUs, GPUs, and CV/DL accelerators may be any one of a number of these elements known in the art. Similarly, ROM 903 and BIOS 905 may be any one of a number of ROM and BIOS known in the art, and system memory 904 may be any one of a number of volatile storage known in the art.

Additionally, computing platform 900 may include persistent storage devices 906. Example of persistent storage devices 906 may include, but are not limited to, flash drives, hard drives, compact disc read-only memory (CD-ROM) and so forth. Further, computing platform 900 may include one or more input/output (I/O) interfaces 908 to interface with one or more I/O devices, such as sensors 920. Other example I/O devices may include, but are not limited to, display, keyboard, cursor control and so forth. Computing platform 900 may also include one or more communication interfaces 910 (such as network interface cards, modems and so forth). Communication devices may include any number of communication and I/O devices known in the art. The communication interfaces may enable wired and/or wireless communications for the transfer of data/Examples of communication devices may include, but are not limited to, networking interfaces for Bluetooth®, Near Field Communication (NFC), WiFi, Cellular communication (such as LTE 4G/5G) and so forth. The elements may be coupled to each other via system bus 911, which may represent one or more buses. In the case of multiple buses, they may be bridged by one or more bus bridges (not shown).

Each of these elements may perform its conventional functions known in the art. In particular, ROM 903 may include BIOS 905 having a boot loader. System memory 904 and mass storage devices 906 may be employed to store a working copy and a permanent copy of the programming instructions implementing the operations associated with a hypervisor, a service/user OS of a service/user VM (see, e.g., FIG. 6), an AI, or other hardware and/or software in a vehicle or accessible to a remote viewer, collectively referred to as computational logic 922. The various elements may be implemented by assembler instructions supported by processor core(s) of SoCs 902 or high-level languages, such as, for example, C, that can be compiled into such instructions.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 10:
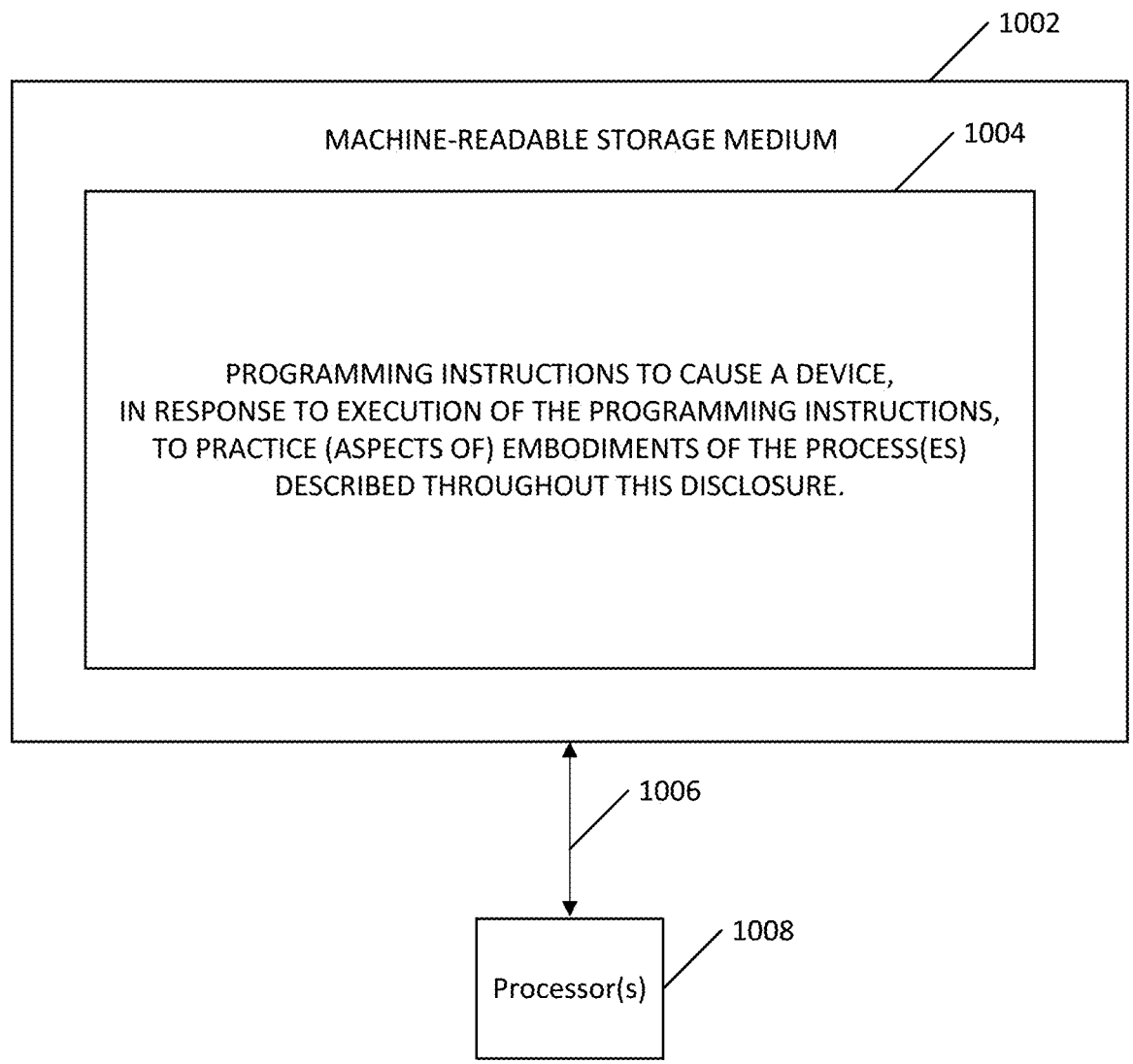
FIG. 10 illustrates an example computer-readable non-transitory storage medium.

FIG. 10 illustrates an example computer-readable non-transitory storage medium 1002 that may be suitable for use to store instructions that cause an apparatus, in response to execution of the instructions by the apparatus, to practice selected aspects of the present disclosure. As shown, storage medium 1002 may include a number of programming instructions 1004. Programming instructions 1004 may be configured to enable a device, e.g., computing platform 900, in response to execution of the programming instructions, to implement (aspects of) hypervisor 612, service/user OS of service/user VM, and components of the remote viewer recommendation technology, as well as an AI associated with a mobile device, vehicle, or other machine as discussed herein. In alternate embodiments, programming instructions 1004 may be disposed on multiple computer-readable non-transitory storage media 1002 instead. In still other embodiments, programming instructions 1004 may be disposed on computer-readable transitory storage media 1002, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood each block of the flowchart illustrations and/or block diagrams, and combinations of blocks in the flowchart illustrations and/or block diagrams, can be implemented by computer program instructions. These computer program instructions may be provided 1006 to one or more processor 1008 of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Example 1 may be a system for operating an AD/SAD vehicle in communication over a network with at least one remote viewer, the vehicle having an associated environment the vehicle is within, the environment potentially including a threat to the vehicle, the system comprising: a first sensor to sense the threat in the environment; a simulator to prepare a construct to simulate the environment including the threat, the simulation to alter at least one of the environment or the threat; an output to provide the construct over the network to the at least one remote viewer; an input to receive at least one recommendation responsive to the construct; and an artificial intelligence (AI) associated with the vehicle to identify a candidate response to the threat based at least in part on knowledge associated with the AI, compare the candidate response to the at least one recommendation, and determine an action to perform in response to the threat based at least in part on the compare.

Example 2 may be example 1, further comprising a correlator to correlate a set of potential responses to the threat and identify an outlier recommendation.

Example 3 may be any of examples 1-2, wherein: the simulator translates the environment from a first format into an abstract format where activity in the environment corresponds to activity in the abstract format; and the recommendation to be translated from the abstract format to the first format and correspond to an action to be taken by the AI to respond to the environment.

Example 4 may be example 3, wherein the abstract format comprises a game in which activity of a first object in the environment is mapped to activity of a second object in the game.

Example 5 may be any of examples 1-4, wherein the construct alters the environment by changing one or more of: presentation speed, color, sound, object presentation as a wireframe format, object highlighting, adding an animation to the environment, deleting an object from the environment, gamification of the environment.

Example 6 may be any of examples 1-5 wherein the AI trains based at least in part on the at least one recommendation.

Example 7 may be example 1, wherein the neural network trains at least in part based on receiving data from the at least one remote viewer.

Example 8 may be a method for operating a vehicle at least partially controlled by a neural network in communication with at least one sensor associated with the vehicle providing first sensor data in a first format, a control within the vehicle, and at least one remote viewer to receive second sensor data in a second format corresponding to the first sensor format, the method comprising the neural network: receiving the first sensor data; identifying a threat to the vehicle; providing the second sensor data to the at least one remote viewer; identifying by the neural network a candidate response to the threat; receiving one or more proposed response to the threat from the at least one remote viewer; determining an action to perform responsive to the threat based at least in part on comparing the candidate response to selected ones of the one or more proposed response.

Example 9 may be example 8, in which the at least one remote viewer is configured to access an interface configured based at least in part based on receiving the second sensor data in the second format, the interface to include a selected one or more of: a non-real-time representation of the first sensor data, a time-compressed representation of the first sensor data, and a gamification of an environment around the vehicle, the environment including at least a representation of a view available to a driver of the vehicle.

Example 10 may be example 9, wherein the interface corresponds to an analysis of interaction between the at least one remote viewer with different presentation formats of the second sensor data.

Example 11 may be any of examples 8-10, further comprising: providing a simulation of a threat scenario to a selected one or more of the at least one remove viewer, or a driver of the vehicle; and receiving, responsive to at least the providing the simulation, the proposed response from the selected one of the at least one remote viewer.

Example 12 may be any of examples 8-11, the determining the action to perform further comprising: receiving multiple proposed responses from multiple remote viewers; correlating selected ones of the multiple proposed responses and the candidate response; and determining the action to take based at least in part on the correlating.

Example 13 may be any of examples 8-12 wherein the vehicle is a selected one of: an autonomous driving vehicle, or a semi-autonomous driving vehicle.

Example 14 may be any of examples 8-13, wherein the neural network trains at least in part based on receiving data from the at least one remote viewer.

Example 15 may be one or more non-transitory computer-readable media associated with a vehicle at least partially controlled by a neural network in communication with at least one sensor associated with the vehicle providing first sensor data in a first format, a control within the vehicle, and at least one remote viewer to receive second sensor data in a second format corresponding to the first sensor format, the media having instructions to provide for: receiving the first sensor data; identifying a threat to the vehicle; providing the second sensor data to the at least one remote viewer; identifying by the neural network a candidate response to the threat; receiving one or more proposed response to the threat from the at least one remote viewer; determining an action to perform responsive to the threat based at least in part on comparing the candidate response to selected ones of the one or more proposed response.

Example 16 may be example 15, in which the at least one remote viewer is configured to access an interface configured based at least in part based on receiving the second sensor data in the second format, and the media further comprising instructions to provide for the interface to include a selected one or more of: a non-real-time representation of the first sensor data, a time-compressed representation of the first sensor data, and a gamification of an environment around the vehicle, the environment including at least a representation of a view available to a driver of the vehicle.

Example 17 may be example 16, wherein the instructions to provide for the interface includes instructions to analyze interaction between the at least one remote viewer with different presentation formats of the second sensor data.

Example 18 may be any of examples 15-17, further comprising instructions to provide for: providing a simulation of a threat scenario to a selected one or more of the at least one remove viewer, or a driver of the vehicle; and receiving, responsive to at least the providing the simulation, the proposed response from the selected one of the at least one remote viewer.

Example 19 may be any of examples 15-18, the instructions to provide for determining the action to perform further comprising instructions to provide for: receiving multiple proposed responses from multiple remote viewers; correlating selected ones of the multiple proposed responses and the candidate response; and determining the action to take based at least in part on the correlating.

Example 20 may be any of examples 15-19, in which the vehicle is an autonomous vehicle, and the media further providing instructions to provide for the neural network and for the neural network to train based at least in part on receiving data from the at least one remote viewer.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A navigation system for a vehicle, the navigation system comprising:
    at least one processor comprising circuitry and a memory, wherein the memory incudes instructions that when executed by the circuitry cause the at least one processor to:
        receive sensor data acquired by at least one sensor associated with the vehicle from an environment of the vehicle;
        analyze the sensor data to identify at least one potential threat to the vehicle in the environment of the vehicle;
        generate at least one construct representing the environment of the vehicle and the at least one potential threat;
        cause the at least one construct to be transmitted to a plurality of remote viewers;
        generate, using an artificial intelligence model, at least one candidate response to the potential threat,
        receive a plurality of proposed responses to the potential threat from the plurality of remote viewers;
        select one or more proposed responses from the plurality of proposed responses, wherein selecting the one or more proposed responses includes identifying at least one common characteristic shared by the one or more proposed responses;
        determine an action to perform responsive to the threat based at least in part on a comparison of the at least one candidate response to the selected one or more proposed responses; and
        cause the vehicle to perform the determined action.

2. The system of claim 1, wherein the memory further includes instructions that when executed by the circuitry cause the at least one processor to update the artificial intelligence model based on the determined action.

3. The system of claim 1, wherein causing the at least one construct to be transmitted to the plurality of remote viewers includes causing a feed of the sensor data to be transmitted to the plurality of remote viewers.

4. The system of claim 1, wherein generating the at least one construct includes generating a virtual representation of the environment.

5. The system of claim 4, wherein the virtual representation of the environment includes a virtual representation of the threat.

6. The system of claim 4, wherein the potential threat includes a predicted threat and the virtual representation includes a simulated representation of the predicted threat.

7. The system of claim 4, wherein the at least one construct includes a time-compressed representation of the environment.

8. The system of claim 7, wherein the memory further includes instructions that when executed by the circuitry cause the at least one processor to determine whether to present at least one of the plurality of remote viewers with the time-compressed representation of the environment based on a characteristic of the potential threat.

9. The system of claim 8, wherein the characteristic of the potential threat includes a speed of an object associated with the potential threat.

10. The system of claim 8, wherein the characteristic of the potential threat includes a degree of complication associated with the environment.

11. The system of claim 4, wherein the at least one construct includes a slowed down representation of the environment.

12. The system of claim 1, wherein selecting the one or more proposed responses further includes identifying an outlier response that does not share the at least one common characteristic.

13. The system of claim 1, wherein the artificial intelligence model includes a trained neural network.

14. The system of claim 1, wherein generating the at least one construct includes generating at least a first construct and a second construct, the first construct representing a different predicted scenario from the second construct, and wherein causing the at least one construct to be transmitted to the plurality of remote viewers includes causing the first construct to be transmitted to a first remote viewer of the plurality of remote viewers and causing the second construct to be transmitted to a second remote viewer of the plurality of remote viewers.

15. The system of claim 1, wherein the memory further includes instructions that when executed by the circuitry cause the at least one processor to select the plurality of remote viewers from a plurality of candidate remote viewers.

16. The system of claim 15, wherein the plurality of remote viewers are selected based on at least one of a determined availability of the plurality of remote viewers or a determined cost associated with the plurality of remote viewers.

17. The system of claim 1, wherein at least one remote viewer of the plurality of remote viewers includes an additional artificial intelligence model.

18. The system of claim 1, wherein the vehicle is an autonomous driving vehicle or a semi-autonomous driving vehicle.

19. A method for navigating a vehicle, the method comprising:
    receiving sensor data acquired by at least one sensor associated with the vehicle from an environment of the vehicle;

analyzing the sensor data to identify at least one potential threat to the vehicle in the environment of the vehicle;

generating at least one construct representing the environment of the vehicle and the at least one potential threat;

causing the at least one construct to be transmitted to a plurality of remote viewers;

generating, using an artificial intelligence model, at least one candidate response to the potential threat, receiving a plurality of proposed responses to the potential threat from the plurality of remote viewers;

selecting one or more proposed responses from the plurality of proposed response, wherein selecting the one or more proposed responses includes identifying at least one common characteristic shared by the one or more proposed responses;

determining an action to perform responsive to the threat based at least in part on a comparison of the at least one candidate response to the selected one or more proposed responses; and causing the vehicle to perform the determined action.

20. A non-transitory computer readable medium containing instructions that when executed by at least one processor, cause the at least one processor to perform a method for navigating a vehicle, the method comprising:

receiving sensor data acquired by at least one sensor associated with the vehicle from an environment of the vehicle;

analyzing the sensor data to identify at least one potential threat to the vehicle in the environment of the vehicle;

generating at least one construct representing the environment of the vehicle and the at least one potential threat;

causing the at least one construct to be transmitted to a plurality of remote viewers;

generating, using an artificial intelligence model, at least one candidate response to the potential threat, receiving a plurality of proposed responses to the potential threat from the plurality of remote viewers;

selecting one or more proposed responses from the plurality of proposed response, wherein selecting the one or more proposed responses includes identifying at least one common characteristic shared by the one or more proposed responses;

determining an action to perform responsive to the threat based at least in part on a comparison of the at least one candidate response to the selected one or more proposed responses; and causing the vehicle to perform the determined action.

* * * * *